United States Patent Office 3,132,929
Patented May 12, 1964

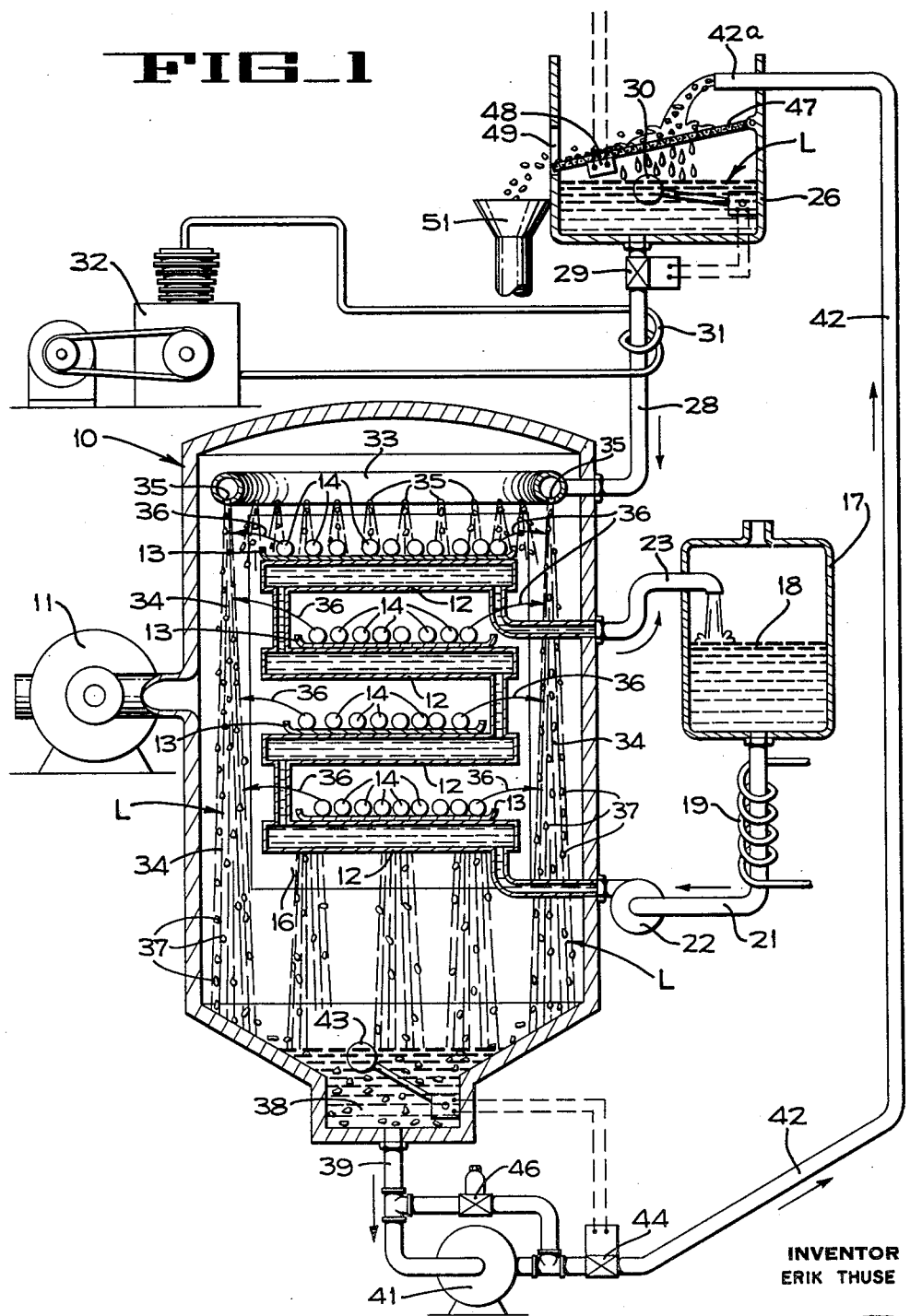

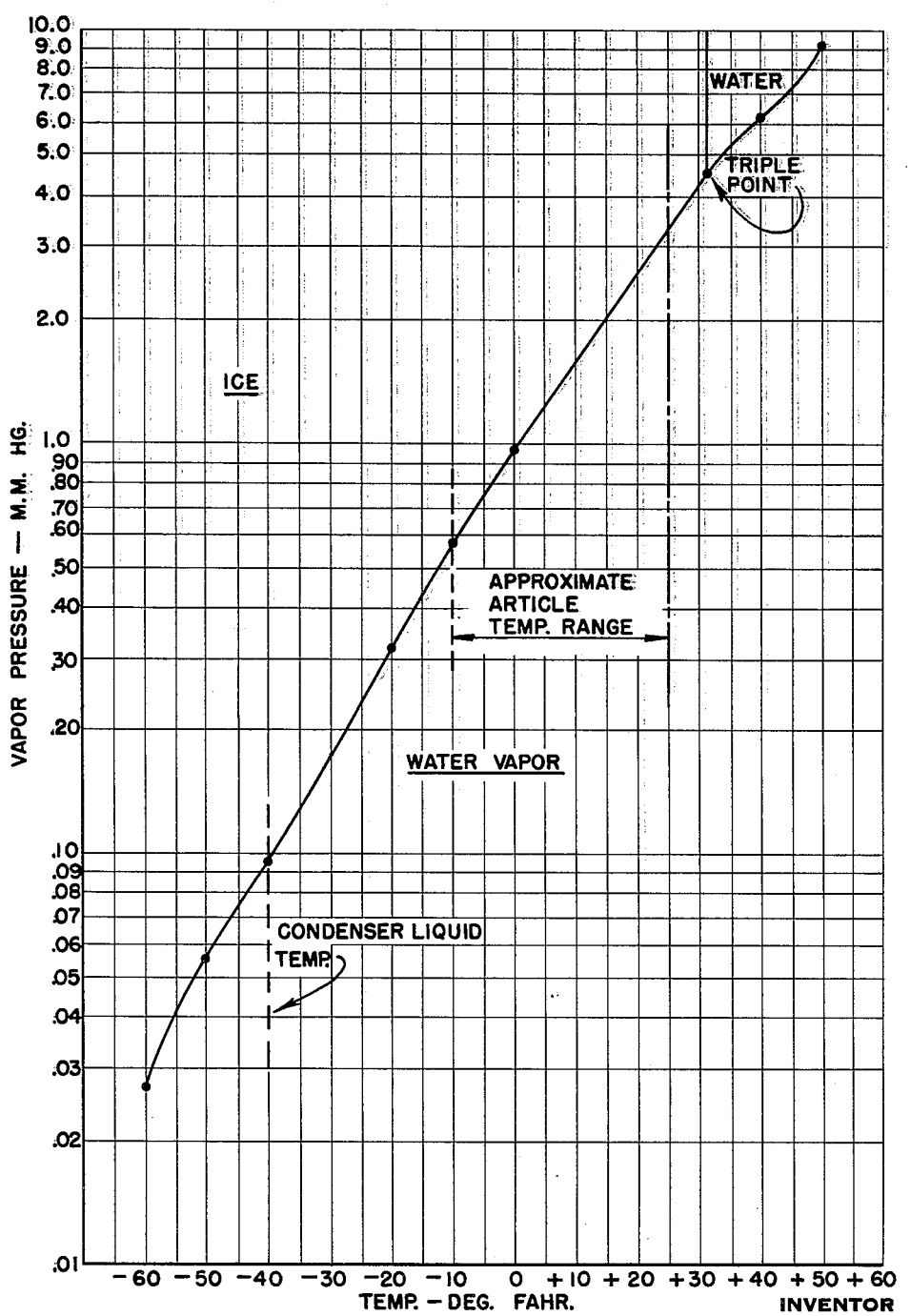

3,132,929
APPARATUS FOR FREEZE DRYING
Erik Thuse, San Jose, Calif., assignor to FMC Corporation, a corporation of Delaware
Filed Nov. 18, 1960, Ser. No. 70,176
3 Claims. (Cl. 34—77)

This invention relates to freeze drying, and more particularly to a freeze drying process and apparatus employing a liquid for condensing and freezing water vapor sublimed from the articles being dried.

The freeze drying process is particularly adapted for use in subliming ice from frozen articles such as food products or bacteriological products because, except for removal of the water, the basic properties of the products are unchanged by the drying process. The process is carried out in a sub-atmospheric pressure chamber such as a vacuum drying chamber, and the water vapor resulting from the sublimation process must be removed to maintain the vacuum in the chamber. The water vapor could be pumped out, but this requires a high capacity pump. Preferably the water vapor is removed in the form of ice crystals formed by freezing the water vapor.

One of the problems of prior drying processes, wherein the water vapor sublimed from the frozen articles is condensed out in the form of ice crystals, has been the removal of the ice crystals from the apparatus. For example, the use of cooling coils or the like results in a deposit of ice crystals on the coils that soon reduces their heat transfer efficiency, so that the coils must be periodically freed of ice during the drying process.

An object of the present invention is to provide a freeze drying process wherein the ice crystals frozen from the sublimated water vapor during the drying process are continuously and automatically removed from the system, before they can reduce the heat transfer efficiency of the condensing medium.

Another object of the invention is to make possible carrying out of the process at sub-freezing temperatures so that the dew point can be quite low, which results in a very dry product after the ice has been sublimated from the product.

These objects are accomplished in the present invention by placing the articles to be dried in a vacuum chamber, with the articles in a frozen condition at about +10° F. Heat is applied to the articles to sublime the ice incorporated therein directly into water vapor, the pressure in the chamber being low enough so that there can be no liquid phase as the ice is sublimed into water vapor. The water vapor is frozen into ice crystals by contact with a film or stream of low temperature condensing liquid falling through the vacuum chamber adjacent the frozen articles. This liquid or condensing medium has a freezing point well below that of water, and the condensing liquid is insoluble in water and is introduced at a temperature substantially below freezing. Thus the ice crystals become entrained with the liquid, and this entrainment permits removal of the slurry of condensing liquid and ice crystals from the drying chamber by an ordinary pump. After such removal of the slurry, separation of the ice crystals from the liquid is readily attained. The condensing liquid is then recirculated through the drying chamber after having again been cooled to the desired sub-freezing temperature.

Another object of the invention is to make possible the recirculation of the condensing liquid.

Another object of the invention is to use the condensing liquid as a seal for the vacuum chamber at both the entrance and exit passages for the liquid.

A further object is that of reducing the volume demands of the vacuum pump for the drying chamber. The latter object is made possible because the sublimed water vapor is condensed into ice crystals directly in the drying chamber adjacent the frozen articles. Removal of the water vapor in the form of ice crystals reduces the capacity demands on the vacuum pump for the drying chamber. By passing the condensing liquid through the vacuum chamber as a sheet or stream that closely surrounds the articles, the water vapor sublimed from the articles flows by a very short path directly to the condensing liquid and substantially all of the vapor is frozen, there being virtually no vapor that finds its way to the vacuum outlet. Thus the vacuum pump need only be large enough to supply the initial vacuum, and need not pump any significant amount of water vapor.

Another object of the invention is that of providing a simple means for separating the ice crystals from the condensing liquid. This is accomplished by provision of a vibrating screen at the condensing liquid reservoir that intercepts the slurry of recirculated liquid and ice crystals.

The manner in which these and other objects may be obtained will be apparent from the following detailed description of the invention and the accompanying drawings, wherein:

FIGURE 1 is a diagram of the system of the invention employing a condensing liquid that is insoluble in water.

FIGURE 2 is a pressure-temperature curve showing the operating conditions in the system.

FIGURE 1 is a diagram of the system employing a condensing liquid that is not soluble in, and that is immiscible with water. The system includes a vacuum drying chamber 10 made to withstand atmospheric pressure, which chamber can be evacuated by a vacuum pump 11. Mounted within the drying chamber is a series of hollow article support platforms 12 for receiving metal trays 13 containing the articles 14 to be dried. The usual access door 16 is provided for loading and unloading the drying chamber. The article support platforms 12 are hollow and are connected to a reservoir 17 containing a heating liquid 18 such as water, which is heated by any suitable means such as resistance heating coils 19. The heated water is directed from a discharge line 21 to a pump 22 that circulates the hot water upwardly through the hollow article supports 12 and back to the reservoir by means of a discharge line 23. The temperature of the heating water 18 will be in the range of 110° F. to 150° F.

A reservoir 26 is provided for the liquid condensing medium L. This medium is, as mentioned, insoluble in water, and is non volatile, odorless, and non toxic, the preferred liquid being tetra-2-ethylhexyl silicate. Other suitable non-soluble liquids are di-2-ethylbutyl adipate and di-2-ethylbutyl azelate. The specific gravity of these liquids is about the same as that of ice. The condensing liquid leaves the reservoir 26 by means of discharge line 28 under control of an electrically controlled flow control and float assembly 30. When the liquid level in the reservoir falls to a certain minimum height, the float of the liquid level control assembly causes valve 29 to close by means of the electric circuit, preventing further depletion of the tank, the purpose of the flow control system is to ensure that there is a supply of liquid in the reservoir 26 to provide a gas seal for the drying chamber, so that the vacuum pump will not draw in atmospheric air.

The condensing liquid L is brought down to a temperature of −40° F. by cooling coils 31 surrounding the line 28 and connected to a compressor and refrigerating unit 32. A manifold 33 is mounted in the upper portion of the drying chamber and is formed to direct a stream or sheet 34 of cooling liquid downwardly around the periphery of the article supporting platforms. The manifold has discharge openings 35 spaced about its periphery and, as indicated by arrows 36, water vapor sublimed from the articles 14 finds its way directly to the stream or sheet 34 of condensing cooling liquid L, whereupon the water vapor is frozen into ice crystals 37.

The slurry of cooling liquid and ice crystals drops to the sump 38 of the drying chamber, and is discharged by line 29 connected to a recirculating pump 41. The pump forces the slurry through a line 42 back into the liquid reservoir 26. In order to ensure that there is a supply of liquid in the sump, to provide a vacuum seal at this connection, a liquid level float assembly 43 is provided which controls an electrically operated flow control valve 44 in the discharge line 42. When the flow control valve 44 is closed to prevent emptying of the sump 38, the pump merely recirculates the condensing liquid through a spring loaded bypass valve 46.

The articles 14 are frozen before insertion into the drying chamber and have an initial temperature of about +10° F.

The heat supplied from the hot water 18 and conducted through the platforms 12 and the trays 13, soon sublimes the ice in the articles 14 directly into water vapor. The pressure in the drying chamber 10 will be low enough (under 4.5 mm. of Hg) so that the operation takes place below the triple point, with which there is no liquid phase, but the ice in the articles sublimes directly into water vapor. Thus the articles are never wetted. As mentioned, the water vapor, as indicated by arrows 36, finds its way directly to the sheet or the stream 34 of liquid L which liquid has been cooled to a temperature of −40° F. and, therefore, there is a much lower vapor pressure over the condensing liquid L than over the ice remaining in the articles 14. Thus the water vapor finds its way directly to the condensing liquid stream 34 and crystallizes out as ice particles 37, as previously mentioned. As the action continues, the temperature of the ice core in the articles 14 may rise and may reach a temperature as high as 25° F. This temperature is not critical but the increase in the temperature of the ice core is advantageous in that it shortens the subliming process.

Referring to the pressure-temperature curve of FIG. 2 and summarizing the action, the frozen articles initially have a temperature of +10° F. at which they have a vapor pressure of about 1.6 mm. of mercury, which pressure is well below the triple point of 4.5 mm. of mercury at 32° F. The frozen articles are warmed to hasten direct sublimation of the ice into water vapor, but, as indicated in FIG. 2, the articles are not permitted to reach the freezing temperature of 32° F., rather they are held below a maximum temperature of about 25° F., which keeps them well below the triple point. The vapor pressure of the condensing liquid at −40° F. is less than 0.10 mm. of mercury so that the water vapor condensed from the frozen articles readily finds its way directly to the condensing liquid, whereupon the vapor is frozen into ice crystals that are entrained in the immiscible sheet of condensing liquid falling through the vacuum chamber adjacent the supports for the frozen articles.

The only critical consideration as to the temperature of the ice in the articles 14 is that the articles should not be heated to a temperature above the melting point of ice, so that sublimation will take place without introducing any liquid to the articles whatsoever. This direct sublimation of ice from frozen articles produces articles of food, for example, that can be reconstituted in water and such articles will retain their original flavor and nutritive elements, as is well known in the freeze drying art.

Means are provided at the condensing liquid reservoir 26 to separate or screen the ice particles 37 from the condensing liquid L. Such means are in the form of a screen 47 interposed between the discharge nozzle 42a of the condensing liquid recirculating line 42 and the bottom of the reservoir. The screen may be vibrated as by an electromagnetic vibrator 48 attached thereto, so that the ice particles 37 are discharged through an opening 49 in the reservoir 26 and collected by suitable means such as a chute 51, whereupon they are melted and disposed of as water.

Because of the fact that a good vapor seal is ensured at both the entrance and exit lines for the drying chamber, and since the water vapor that is sublimed from the articles tends to go directly to the condensing liquid as it descends through the chamber in the form of streams 34, the vacuum pump 11 need not be of large capacity. The pump need only exhaust the air that is initially present in the drying chamber, and will readily pick up the small amount of water vapor not collected and frozen by the condensing medium liquid. The amount of unfrozen water vapor present is so small that its presence will not require an increase in the capacity requirements of the pump over that required to evacuate chamber 10 initially.

Having thus described my invention, what I claim as new and desire to protect by Letters Patent is:

1. Apparatus for drying water-bearing articles that are frozen comprising a drying chamber, article supporting means in said chamber, means for evacuating said chamber to a pressure less than the vapor pressure over ice at the freezing temperature of water, means for heating the articles to sublime the ice in the articles, a liquid reservoir, a liquid in said reservoir having a freezing point that is substantially lower than that of water, said liquid being insoluble in water, means for conducting liquid from said reservoir to said chamber, means for passing a free column of said liquid through said chamber, means for cooling said liquid before it is passed through said chamber to a temperature below the temperature of the frozen articles so that water vapor sublimed from the frozen articles is condensed directly into ice crystals upon contact with said column of liquid, a sump below said chamber for receiving the slurry of liquid and ice crystals, means for maintaining a body of slurry in said sump, means for pumping the mixture of liquid and ice crystals from said sump to said reservoir, a screen at said reservoir for separating the ice crystals from said liquid, and means for maintaining a body of liquid in said reservoir to provide a liquid column between the reservoir and said chamber.

2. Apparatus for drying frozen articles comprising a drying chamber having top and bottom walls and a circumferentially continuous substantially vertical side wall, means forming a sump at the bottom of said chamber, vertically spaced article supporting means in said chamber with the peripheral edges thereof spaced from said chamber side wall, means for heating the articles to sublime the ice in the articles, a source of liquid that is immiscible with water and has a freezing point lower than that of water, means for cooling said liquid below the freezing point of water, manifold means connected to said liquid source, said manifold means being above and substantially encircling said article supporting means for causing a sheet-like column of said liquid to fall freely through said chamber adjacent said article supporting means and into said sump, said column of liquid being spaced from but substantially surrounding said article supporting means, said column of liquid also being spaced from said chamber side wall, means for evacuating said chamber including a vacuum pump connection to the side wall of said chamber below said manifold means and above said sump, said column of liquid intercepting water vapor emanating from articles at said article supporting means and freezing the water vapor into ice crystals, said column of liquid and entrained ice crystals falling into said sump, said column of liquid serving as a vapor screen between said vacuum pump connection and said article supporting means, and means for removing the ice crystals and liquid from said chamber.

3. The apparatus of claim 2 wherein said source of liquid comprises a reservoir above said drying chamber, means for pumping the slurry of liquid and ice crystals from said sump directly to said reservoir, means for maintaining a body of slurry in said sump, means at said reservoir for separating ice crystals from said liquid, and means for maintaining a body of liquid in said reservoir to provide a liquid column between the reservoir and said manifold means.

References Cited in the file of this patent

UNITED STATES PATENTS

| | | |
|---|---|---|
| 1,019,743 | Tiemann | Mar. 5, 1912 |
| 2,507,632 | Hickman | May 16, 1950 |
| 2,613,513 | Shields | Oct. 14, 1952 |
| 2,780,281 | Reinert | Feb. 5, 1957 |
| 2,913,883 | Burgess | Nov. 24, 1959 |

FOREIGN PATENTS

| | | |
|---|---|---|
| 979,825 | France | Dec. 13, 1950 |